(12) United States Patent
Morino et al.

(10) Patent No.: US 11,492,161 B2
(45) Date of Patent: Nov. 8, 2022

(54) BAG SUPPLY SYSTEM

(71) Applicant: TOYO JIDOKI CO., LTD., Tokyo (JP)

(72) Inventors: Manabu Morino, Yamaguchi-ken (JP); Kazuo Fukunaga, Yamaguchi-ken (JP); Shota Kajihara, Yamaguchi-ken (JP); Takayuki Utsunomiya, Yamaguchi-ken (JP)

(73) Assignee: TOYO JIDOKI CO., LTD., Tokyo (JP)

( * ) Notice: Subject to any disclaimer, the term of this patent is extended or adjusted under 35 U.S.C. 154(b) by 27 days.

(21) Appl. No.: 17/072,880

(22) Filed: Oct. 16, 2020

(65) Prior Publication Data

US 2021/0130020 A1    May 6, 2021

(30) Foreign Application Priority Data

Oct. 31, 2019  (JP) .............................. JP2019-198564

(51) Int. Cl.
*B65B 35/50* (2006.01)
*B65B 5/06* (2006.01)

(52) U.S. Cl.
CPC ................ *B65B 35/50* (2013.01); *B65B 5/06* (2013.01)

(58) Field of Classification Search
USPC ........................................................ 53/147
See application file for complete search history.

(56) References Cited

U.S. PATENT DOCUMENTS

| | | | |
|---|---|---|---|
| 2003/0136086 A1* | 7/2003 | Kalany | B65G 54/02 53/443 |
| 2010/0199599 A1* | 8/2010 | Bonnain | B65B 43/285 53/147 |
| 2016/0132059 A1* | 5/2016 | Mason | G05D 1/0234 701/28 |
| 2020/0255249 A1* | 8/2020 | Michel | B65H 29/32 |
| 2020/0376662 A1* | 12/2020 | Arase | B25J 9/1664 |

FOREIGN PATENT DOCUMENTS

| | | | |
|---|---|---|---|
| EP | 1923341 A2 * | 5/2008 | ............ B65H 1/30 |
| EP | 3747783 A1 * | 12/2020 | ............ B65B 43/18 |
| JP | 08-21736 A | 8/1996 | |
| JP | 10-016910 A | 1/1998 | |
| JP | 2019-210116 A | 12/2019 | |

* cited by examiner

Primary Examiner — Chinyere J Rushing-Tucker
(74) Attorney, Agent, or Firm — Pillsbury Winthrop Shaw Pittman, LLP

(57) ABSTRACT

A bag supply system includes: a bag bundle delivery device moves bag bundles from a delivery relay position to a delivery zone; a bag bundle conveyance device which receives the bag bundles from the bag bundle delivery device in the delivery zone and conveys the bag bundles from the delivery zone to a supply zone in a state where the bag bundles are supported by a support part; a bag bundle takeoff device which holds the bag bundles supported by the support part in the supply zone and moves the bag bundles from the bag bundle conveyance device to a supply relay position; and a bag supply device which sequentially supplies bags included in each of the bag bundles arranged in the supply relay position, to a packaging machine. The support part moves along an endless track between the delivery zone and the supply zone.

12 Claims, 15 Drawing Sheets

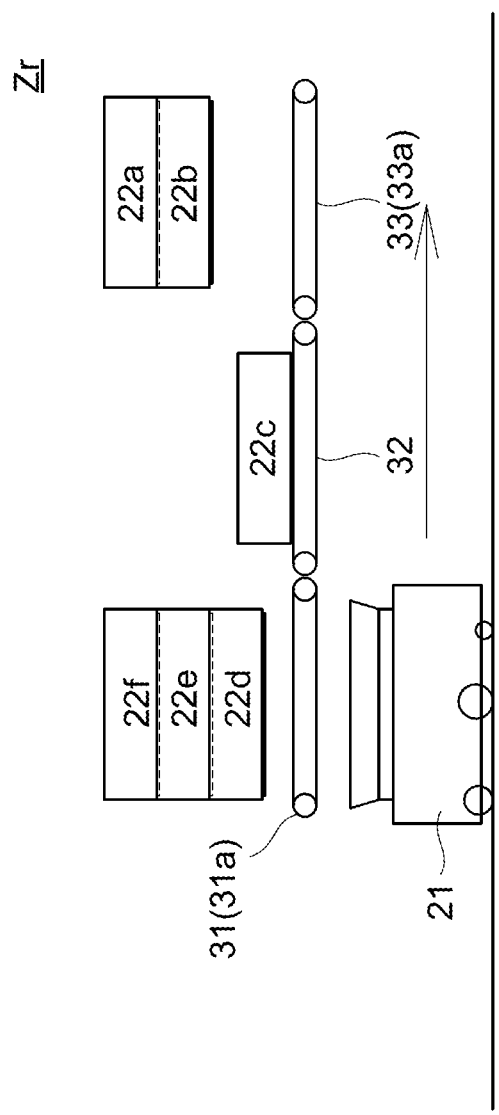

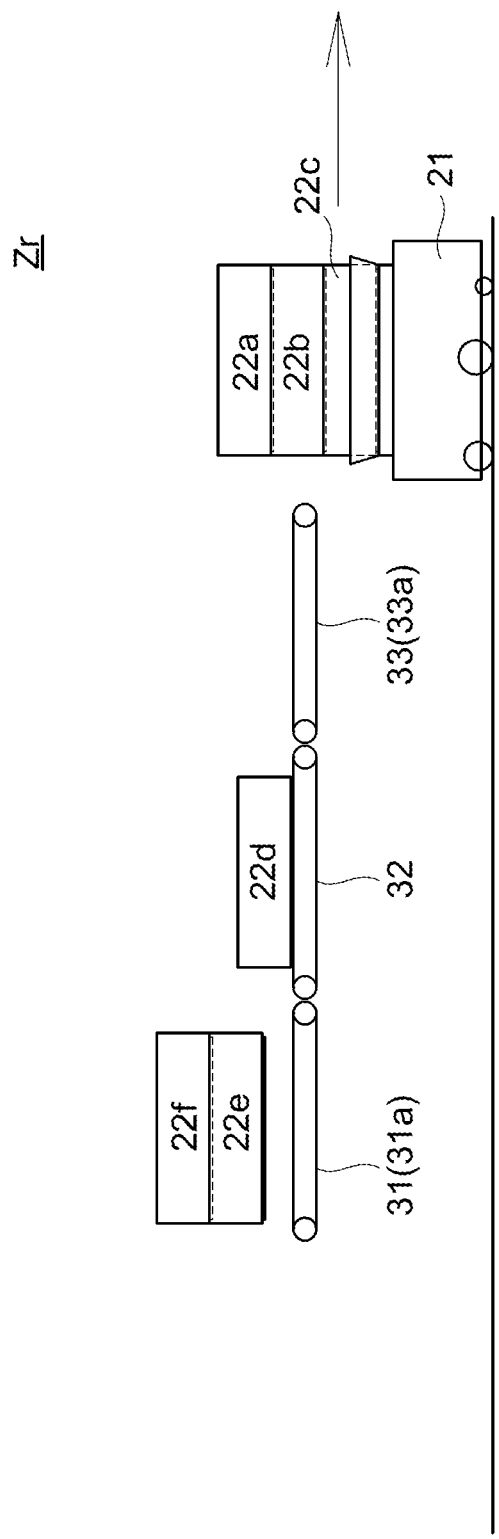

BAG SUPPLY SYSTEM

CROSS-REFERENCE TO RELATED APPLICATIONS

This application is based upon and claims the benefit of priority from Japanese Patent Application No. 2019-198564, filed on Oct. 31, 2019; the entire contents of which are incorporated herein by reference.

TECHNICAL FIELD

The present disclosure relates to a bag supply system.

BACKGROUND ART

Apparatuses that stack a plurality of bags so as to form a bag bundle and stores a plurality of bag bundles in a container box are known. For example, Japanese patent application publication No. 10-16910 discloses a method including the steps of: forming a bundle of a plurality of bags which are stacked; placing two bag bundles onto a tray while the orientations of the two bag bundles are differentiated from each other; placing a pad, from above, onto these bag bundles being placed on the tray; and causing a robot to grip bag bundle groups on which pads are placed in the tray and to serially put them into a container.

Further, apparatuses that take a bag bundle out of a container box and supply the bag bundle to a subsequent stage are known. For example, Japanese patent application publication No. 8-217236 discloses a method including the steps of: placing bag bundles, which have been placed in a depalletizing position where bag bundles are taken out of a container, onto trays one by one; determining the orientations of bag bundles conveyed with trays; adjusting the orientations of bag bundles to have a common direction by rotating the trays by 180 degrees according to the orientation determination signals; cutting and removing a band of each of the bag bundles being placed on the trays; and taking bag groups, which have been released from a bundle state, out of each tray.

SUMMARY OF INVENTION

An apparatus for producing a bag and an apparatus for performing processing using the bag are usually provided at positions separated from each other, and the bag is conveyed between these apparatuses via a container box (that is, a container). The container box is conveyed between devices by a worker, and when a large number of bags are conveyed, the worker bears a large burden that accompanies the transfer of a container box. In addition, it is not preferable in terms of safety and hygiene that a person is on a conveyance route of bags. Further, it is possible to use a plurality of container boxes for conveying a large number of bags, but in such a case, it is necessary to adjust the conveyance timing of each container box so that the plurality of container boxes do not interfere with each other on the conveyance route.

The present disclosure has been made in view of the above circumstances and provides a technique that enables appropriately performing a series of processes including the conveyance of bags and the supply of the bags to a subsequent stage without intervention of a worker.

One aspect of the present disclosure is directed to a bag supply system comprising: a bag bundle positioning device which sequentially arranges bag bundles in a delivery relay position, each of the bag bundles including two or more bags supplied from a bag making machine; a bag bundle delivery device which moves the bag bundles from the delivery relay position to a delivery zone; a bag bundle conveyance device which has a support part being capable of moving, receives the bag bundles from the bag bundle delivery device in the delivery zone, and conveys the bag bundles from the delivery zone to a supply zone in a state where the bag bundles are supported by the support part; a bag bundle takeoff device which holds the bag bundles supported by the support part in the supply zone and moves the bag bundles from the bag bundle conveyance device to a supply relay position; and a bag supply device which sequentially supplies bags included in each of the bag bundles arranged in the supply relay position, to a packaging machine, wherein the support part moves along an endless track between the delivery zone and the supply zone.

The bag bundle conveyance device may include: a plurality of moving bodies each of which moves along the endless track between the delivery zone and the supply zone; a plurality of container boxes each of which has the support part and is capable of storing a plurality of bag bundles; a delivery conveyance unit which is provided in the delivery zone; and a supply conveyance unit which is provided in the supply zone, each of the plurality of moving bodies may move between the delivery zone and the supply zone, together with two or more container boxes stacked on each other, the delivery conveyance unit may receive two or more container boxes stacked on each other from each of the plurality of moving bodies, may take out container boxes from the two or more container boxes one by one, and may transfer to each of the plurality of moving bodies two or more container boxes each of which stores two or more bag bundles received from the bag bundle delivery device, in a state where the two or more container boxes are stacked on each other, and the supply conveyance unit may receive two or more container boxes stacked on each other from each of the plurality of moving bodies, may take out container boxes from the two or more container boxes one by one, and may transfer to each of the plurality of moving bodies two or more container boxes from which the bag bundles have been taken out by the bag bundle takeoff device, in a state where the two or more container boxes are stacked on each other.

The delivery conveyance unit may include a first delivery transfer conveyor, a second delivery transfer conveyor, a third delivery transfer conveyor, a first delivery holding unit and a second delivery holding unit, the two or more container boxes which are delivered from each of the plurality of moving bodies and are stacked on each other may be placed on the first delivery transfer conveyor, the first delivery holding unit may lift one or more container boxes from the first delivery transfer conveyor in such a manner that only one container box is placed on the first delivery transfer conveyor, the first delivery transfer conveyor and the second delivery transfer conveyor may be driven in a state where only one container box is placed on the first delivery transfer conveyor in such a manner that the one container box is transferred from the first delivery transfer conveyor and is placed on the second delivery transfer conveyor, the bag bundle delivery device may deliver two or more bag bundles to a container box placed on the second delivery transfer conveyor, the second delivery holding unit may lift one container box or two or more container boxes stacked on each other, from the third delivery transfer conveyor in such a manner that no container box is placed on the third delivery transfer conveyor, and the second delivery transfer conveyor and the third delivery transfer conveyor may be driven, in a state where a container box storing two or more bag bundles is placed on the second delivery transfer conveyor and no container box is placed on the third delivery transfer conveyor, in such manner that the container box storing two or more bag bundles is transferred from the second delivery transfer conveyor and is placed on the third delivery transfer conveyor.

The first delivery transfer conveyor may have two supply opening-closing belts which are capable of being arranged in supply proximity positions which are relatively close to each other, and in supply remote positions which are relatively far from each other, each of the plurality of moving bodies may move to a position corresponding to the first delivery transfer conveyor in such a manner that at least one of two or more container boxes moving along with each of the plurality of moving bodies enters a space formed between the two supply opening-closing belts arranged in the supply remote positions, the first delivery holding unit may lift two or more container boxes from each of the plurality of moving bodies arranged in the position corresponding to the first delivery transfer conveyor in such a manner that no container box is present in the space formed between the two supply opening-closing belts in a state where the two supply opening-closing belts are arranged in the supply remote positions, the two supply opening-closing belts may move from the supply remote positions in a state where no container box is present in the space formed between the two supply opening-closing belts, and are arranged in the supply proximity positions, and the first delivery holding unit may place the two or more container boxes lifted from each of the plurality of moving bodies, onto the two supply opening-closing belts arranged in the supply proximity positions.

The third delivery transfer conveyor may have two discharge opening-closing belts which are capable of being arranged in discharge proximity positions which are relatively close to each other, and in discharge remote positions which are relatively far from each other, a container box sent from the second delivery transfer conveyor may be placed on the two discharge opening-closing belts arranged in the discharge proximity positions, the second delivery holding unit may lift one container box or a plurality of container boxes stacked on each other, from the two discharge opening-closing belts arranged in the discharge proximity positions, the two discharge opening-closing belts may be arranged in the discharge remote positions in a state where no container box is placed on the two discharge opening-closing belts and the second delivery holding unit lifts two or more container boxes stacked on each other, and the second delivery holding unit may move the lifted two or more container boxes in such a manner that at least a part of the lifted two or more container boxes passes a space formed between the two discharge opening-closing belts arranged in the discharge remote positions, and delivers the two or more container boxes to each of the plurality of moving bodies arranged in a position corresponding to the third delivery transfer conveyor.

Each of the plurality of moving bodies may be an automated guided vehicle.

A first supply zone and a second supply zone may be provided in mutually different areas as said supply zone, a first supply relay position corresponding to the first supply zone and a second supply relay position corresponding to the second supply zone may be provided as said supply relay position, the bag bundle conveyance device may convey the bag bundles from the delivery zone to at least one of the first supply zone and the second supply zone in a state where the bag bundles is supported by the support part, the bag bundle takeoff device may move the bag bundles which the bag bundle takeoff device holds in the first supply zone, from the bag bundle conveyance device to the first supply relay position, and may move the bag bundles which the bag bundle takeoff device holds in the second supply zone, from the bag bundle conveyance device to the second supply relay position, and the support part may move along the endless track between the delivery zone and at least one of the first supply zone and the second supply zone.

According to the present disclosure, it is possible to appropriately perform a series of processes including the conveyance of bags and the supply of the bags to a subsequent stage without intervention of a worker.

BRIEF DESCRIPTION OF DRAWINGS

FIGS. 4A to 4J are side views for explaining an example of a transfer mode of a plurality of container boxes in a delivery zone.

DESCRIPTION OF EMBODIMENTS

Hereinafter, a typical embodiment (a bag supply system and a bag supply method) will be described with reference to the drawings.

In the following description, the height direction means a direction parallel to and along the vertical direction in which gravity acts, and the horizontal direction means a direction perpendicular to the height direction.

First Embodiment

Figure 1:
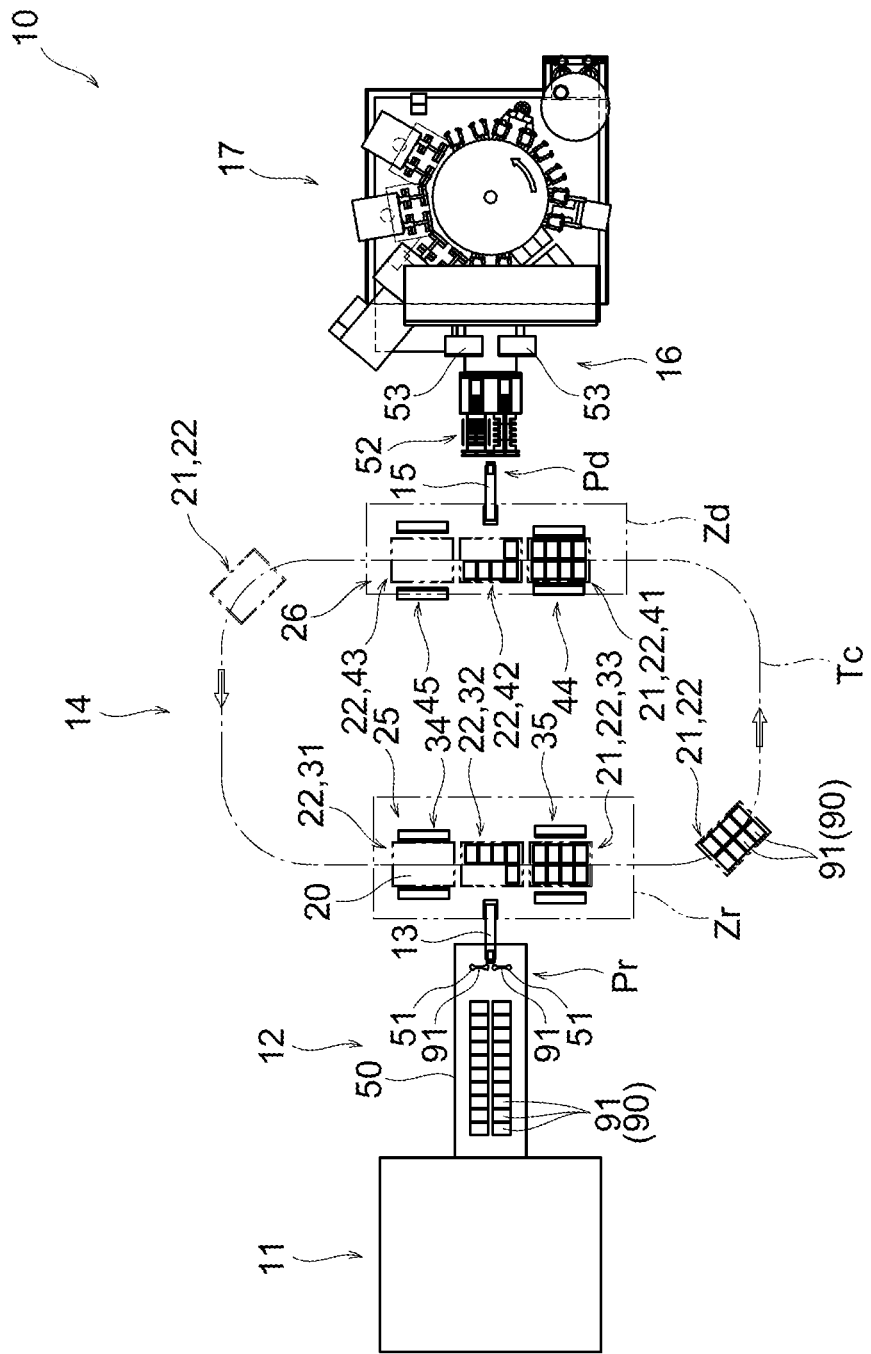
FIG. 1 is a diagram illustrating an example of a bag supply system according to a first embodiment.

FIG. 1 is a diagram illustrating an example of a bag supply system 10 according to a first embodiment.

The bag supply system 10 includes a bag making machine 11, a bag bundle positioning device 12, a bag bundle delivery device 13, a bag bundle conveyance device 14, a bag bundle takeoff device 15, a bag supply device 16 and a packaging machine 17.

The bag making machine 11 manufactures a plurality of bags 90 in a continuous manner and sends out a plurality of bag bundles 91 each including two or more bags 90 to the downstream side. The specific configuration of the bag making machine 11 is not limited. For instance, the bag making machine 11 may weld films to each other so as to manufacture an individual bag 90.

The bag bundle positioning device 12 sequentially arranges bag bundles 91, which each include two or more bags 90 and are supplied from the bag making machine 11, at a delivery relay position Pr. The bag bundle positioning device 12 illustrated in FIG. 1 includes: a transfer device 50 having a transfer conveyor; and delivery grip devices 51 that lift bag bundles 91 from the transfer conveyor of the transfer device 50 and hold the bag bundles 91 in a suspended state. Bag bundles 91 supplied from the bag making machine 11 are placed on the transfer conveyor of the transfer device 50 one after another, are sent towards the delivery relay position Pr by the transfer conveyor, and are held at the delivery relay position Pr by the delivery grip devices 51 in a suspended state.

In the illustrated example, a plurality of bags 90 in the form of a bag bundle 91 are sent out from the bag making machine 11 and supplied to the bag bundle positioning device 12, but individual bags 90 may be supplied from the bag making machine 11 to the bag bundle positioning device 12. In this case, the bag bundle positioning device 12 includes a bag bundle manufacturing unit (not shown) that stacks a plurality of bags 90 to form a bag bundle 91, and bag bundles 91 manufactured by the bag bundle manufacturing unit are arranged at the delivery relay position Pr by the delivery grip devices 51.

The bag bundle delivery device 13 moves bag bundles 91 from the delivery relay position Pr to the delivery zone Zr. The illustrated bag bundle delivery device 13 includes a multi-joint robot (serial link robot) which is capable of moving the tip portion of the robot in three dimensions, and a holding unit which is capable of holding a bag bundle 91 in a manner such as gripping is installed on this tip portion. The bag bundle delivery device 13 may include a mechanism different from a multi-joint robot, and may include another mechanism (for example, a parallel link robot) that is capable of moving a bag bundle 91 three-dimensionally while holding the bag bundle 91. The bag bundle delivery device 13 receives, from the delivery grip devices 51, bag bundles 91 arranged at the delivery relay position Pr and delivers the bag bundles 91 to a container box 22 arranged in the delivery zone Zr.

The bag bundle conveyance device 14 has a support part 20 that is configured so as to be movable between the delivery zone Zr and the supply zone Zd. In the illustrated example, each container box 22 (in particular, the bottom portion) transferred by a moving body 21 includes a support part 20. The bag bundle conveyance device 14 receives a bag bundle 91 from the bag bundle delivery device 13 in the delivery zone Zr, and conveys the bag bundle 91 from the delivery zone Zr to the supply zone Zd in a state where the bag bundle 91 is supported by the support part 20 of a corresponding container box 22.

The bag bundle conveyance device 14 of the present embodiment includes a plurality of moving bodies 21, a plurality of container boxes 22, a delivery conveyance unit 25 provided in the delivery zone Zr, and a supply conveyance unit 26 provided in the supply zone Zd.

Each container box 22 (specifically, each support part 20) moves, together with a corresponding moving body 21, back and forth between the delivery zone Zr and the supply zone Zd along an endless track Tc. Thus, the route that each moving body 21 and each container box 22 follow when moving from the delivery zone Zr to the supply zone Zd does not completely correspond to the route that each moving body 21 and each container box 22 follow when moving from the supply zone Zd to the delivery zone Zr. In the illustrated example, the route that each moving body 21 and each container box 22 follow when moving from the delivery zone Zr to the supply zone Zd is completely different from (in other words, does not overlap at all with) the route that each moving body 21 and each container box 22 follow when moving from the supply zone Zd to the delivery zone Zr.

Each of the moving bodies 21 shown in FIG. 1 is configured by an automated guided vehicle (i.e., AGV) which moves, together with two or more container boxes 22 stacked on top of each other, along the endless track Tc between the delivery zone Zr and the supply zone Zd. The automated guided vehicle is an autonomous vehicle that can travel automatically without human operation and can perform guided travel based on an arbitrary guide system.

Each of the plurality of container boxes 22 has a support part 20 configured by a bottom portion and is configured so as to be able to store a plurality of bag bundles 91. Bag bundles 91 supplied via the bag bundle delivery device 13 are successively placed on the support part 20 of each container box 22. The storing mode of bag bundles 91 in each container box 22 is not limited. In the illustrated example, a plurality of bag bundles 91 are laid on the support part 20 of each container box 22 in such a manner that each of the bags 90 included in a bag bundle 91 extends in the horizontal direction and the bag bundles 91 do not overlap each other.

In the delivery zone Zr, the delivery conveyance unit 25 cooperates with each moving body 21 so as to receive an empty container box 22, cooperates with the bag bundle delivery device 13 so as to store a plurality of bag bundles 91 in each container box 22, and cooperates with each moving body 21 so as to send out a container box 22 storing a plurality of bag bundles 91. In the supply zone Zd, the supply conveyance unit 26 cooperates with each moving body 21 so as to receive a container box 22 storing a plurality of bag bundles 91, cooperates with the bag bundle takeoff device 15 in such a manner that the plurality of bag bundles 91 are taken out of each container box 22, and cooperates with each moving body 21 so as to send out an empty container box 22. Structural examples of the delivery conveyance unit 25 and the supply conveyance unit 26 will be described later (see FIGS. 2 to 4).

The bag bundle takeoff device 15 holds a bag bundle 91 supported by a support part 20 in the supply zone Zd and moves the bag bundle 91 from the bag bundle conveyance device 14 (that is, a corresponding container box 22) to a supply relay position Pd. The illustrated bag bundle takeoff device 15 includes a multi-joint robot, and a holding unit which is capable of holding a bag bundle 91 is installed on a tip portion of the multi-joint robot. The bag bundle takeoff device 15 may include a mechanism different from a multi-joint robot and may include, for example, a parallel link robot.

The bag supply device 16 sequentially supplies bags 90 included in a bag bundle 91 arranged at the supply relay position Pd, to the packaging machine 17. The bag supply device 16 of the present embodiment has posture change devices 52 and bag takeoff devices 53. The posture change devices 52 each adjust the posture of bag bundles 91 received from the bag bundle takeoff device 15, and then send the bag bundles 91 toward the bag takeoff devices 53. The bag takeoff devices 53 hold individual bags 90 included in bag bundles 91, whose posture has been adjusted by the posture change devices 52, and supply the individual bags 90 to the packaging machine 17. The posture change devices 52 and the bag takeoff devices 53 may have arbitrary mechanisms. For example, the posture change devices 52 may employ a mechanism disclosed in Japanese patent application No. 2018-108767 (corresponding to Japanese patent application publication No. 2019-210116).

The packaging machine 17 performs packaging processing using a bag 90 supplied via the bag takeoff devices 53. The specific processing of the packaging machine 17 is not limited. The illustrated packaging machine 17 performs printing on each bag 90, opening of each bag 90, feeding of contents into each bag 90, and sealing of the mouth portion of each bag 90, and then sends out each bag 90 to a subsequent stage.

[Delivery Conveyance Unit and Supply Conveyance Unit]

The delivery conveyance unit 25 of the present embodiment receives, from each moving body 21, two or more container boxes 22 that are stacked on each other. The delivery conveyance unit 25 takes out container boxes 22 one by one from the two or more container boxes 22 received from each moving body 21. A plurality of bag bundles 91 are supplied, by the bag bundle delivery device 13, to the container boxes 22 taken out one by one by the delivery conveyance unit 25, and a plurality of bag bundles 91 are placed on the support part 20 of each container box 22. Then, the delivery conveyance unit 25 delivers two or more container boxes 22 each storing two or more bag bundles 91 received from the bag bundle delivery device 13, to each of the plurality of moving bodies 21 in a state where the two or more container boxes 22 are stacked on top of each other.

The supply conveyance unit 26 of the present embodiment receives, from each moving body 21, two or more container boxes 22 that are stacked on each other. The supply conveyance unit 26 takes out container boxes 22 one by one from the two or more container boxes 22 received from each moving body 21. A plurality of bag bundles 91 are taken out by the bag bundle takeoff device 15 from container boxes 22 taken out one by one by the supply conveyance unit 26. Then, the supply conveyance unit 26 delivers two or more container boxes 22 after the bag bundles 91 are taken out by the bag bundle takeoff device 15, to each of the plurality of moving bodies 21 in a state of where the two or more container boxes 22 are stacked on top of each other.

The illustrated delivery conveyance unit 25 includes a first delivery transfer conveyor 31, a second delivery transfer conveyor 32, a third delivery transfer conveyor 33, a first delivery holding unit 34, and a second delivery holding unit 35.

Two or more container boxes 22 which are delivered from each moving body 21 and which are stacked on each other are placed on the first delivery transfer conveyor 31. Each container box 22 delivered to the first delivery transfer conveyor 31 is empty and does not store any bag bundles 91. Specifically, container boxes 22 from which the bag bundles 91 have been taken out in the supply zone Zd, are transferred to the delivery zone Zr by a moving body 21 and are placed on the first delivery transfer conveyor 31.

The first delivery holding unit 34 lifts one or more container boxes 22 from the first delivery transfer conveyor 31 in such a manner that only one container box 22 is placed on the first delivery transfer conveyor 31. When the first delivery holding unit 34 lifts two or more container boxes 22 that are stacked on each other, the first delivery holding unit 34 may hold only the bottom container box 22 of the two or more container boxes 22 while moving the whole of the two or more container boxes 22 in the height direction.

The first delivery transfer conveyor 31 and the second delivery transfer conveyor 32 are driven in a state where only one container box 22 is placed on the first delivery transfer conveyor 31, in such a manner that the one container box 22 is transferred from the first delivery transfer conveyor 31 and is placed on the second delivery transfer conveyor 32.

The bag bundle delivery device 13 delivers two or more bag bundles 91 to a container box 22 placed on the second delivery transfer conveyor 32.

The second delivery holding unit 35 lifts one container box 22 or two or more container boxes 22 stacked on each other, from the third delivery transfer conveyor 33 in such a manner that any container boxes 22 are not placed on the third delivery transfer conveyor 33. When the second delivery holding unit 35 lifts the stacked two or more container boxes 22, the second delivery holding unit 35 may hold only the bottom container box 22 while moving the whole of the stacked two or more container boxes 22 in the height direction.

Then, the second delivery transfer conveyor 32 and the third delivery transfer conveyor 33 are driven in a state where a container box 22 storing a desired number of bag bundles 91 (i.e., 2 or more bag bundles 91) is placed on the second delivery transfer conveyor 32 and any container boxes 22 are not placed on the third delivery transfer conveyor 33. As a result, the container box 22 that stores the two or more bag bundles 91 is transferred from the second delivery transfer conveyor 32 and is placed on the third delivery transfer conveyor 33.

Figure 2:
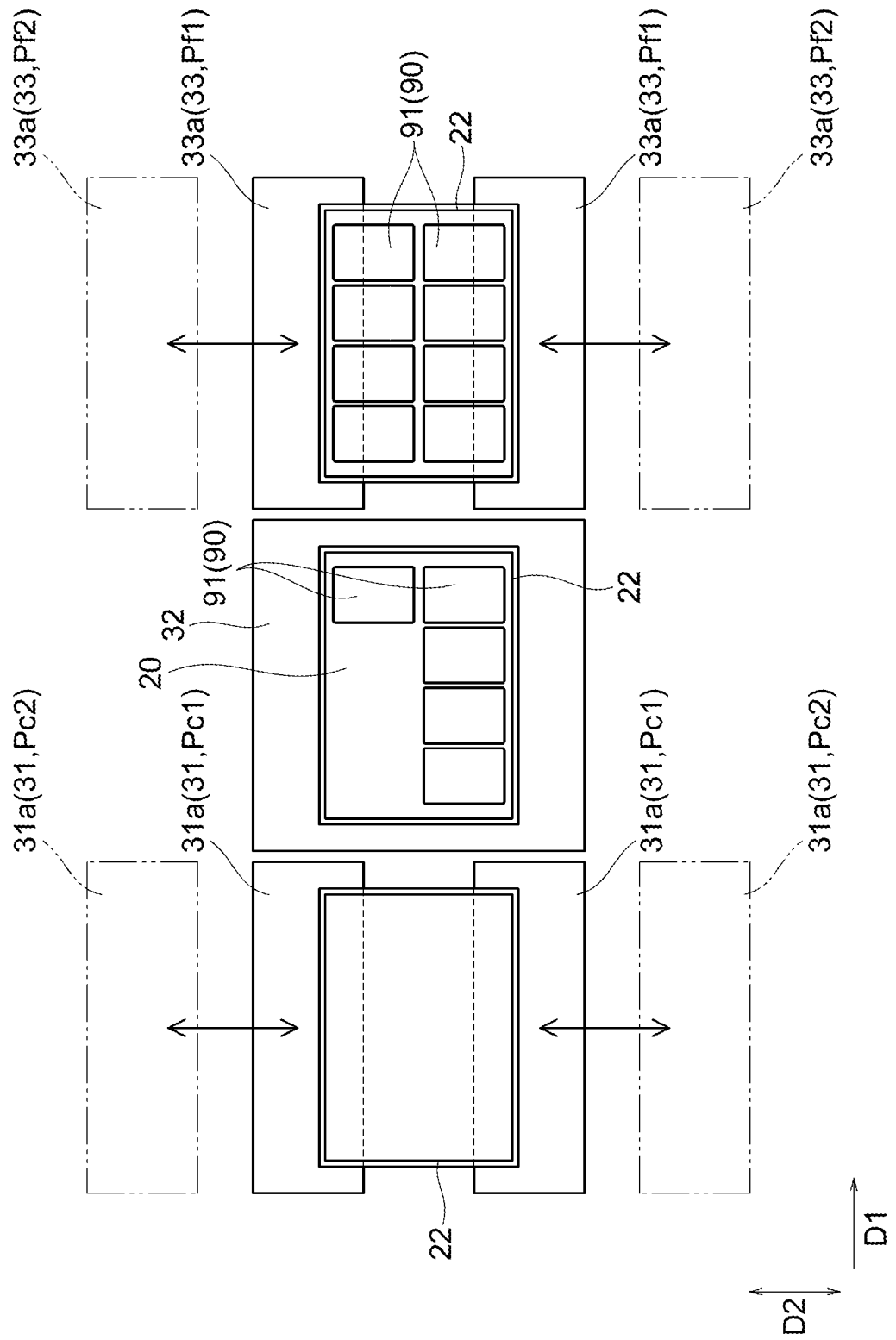
FIG. 2 is a plan view for explaining a configuration example of a first delivery transfer conveyor, a second delivery transfer conveyor and a third delivery transfer conveyor.
Figure 3:
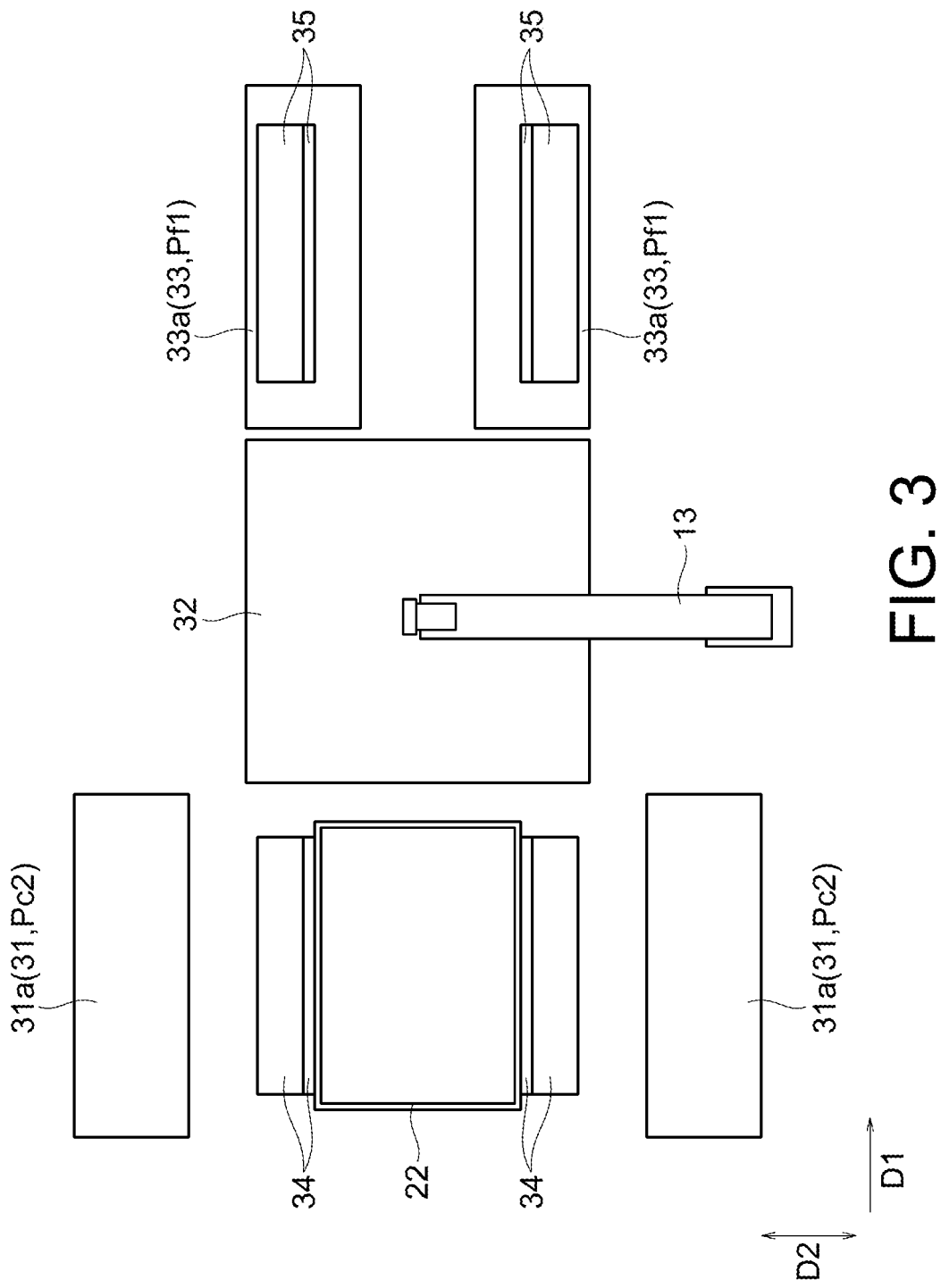
FIG. 3 is a view for explaining an example of a positional relationship of a first delivery holding unit, a bag bundle delivery device and a second delivery holding unit with respect to the first delivery transfer conveyor, the second delivery transfer conveyor and the third delivery transfer conveyor.

FIG. 2 is a plan view for explaining a configuration example of the first delivery transfer conveyor 31, the second delivery transfer conveyor 32, and the third delivery transfer conveyor 33. For ease of understanding, in FIG. 2, the illustration of elements other than the first delivery transfer conveyor 31, the second delivery transfer conveyor 32, the third delivery transfer conveyor 33, container boxes 22 and bag bundles 91, is omitted. FIG. 3 is a plan view for explaining an example of the positional relation of the first delivery holding unit 34, the bag bundle delivery device 13 and the second delivery holding unit 35 with respect to the first delivery transfer conveyor 31, the second delivery transfer conveyor 32 and the third delivery transfer conveyor 33. For ease of understanding, in FIG. 3, the illustration of a moving body 21 is omitted.

The illustrated first delivery transfer conveyor 31 has two supply opening-closing belts 31a, and the third delivery transfer conveyor 33 has two discharge opening-closing belts 33a. The illustrated two supply opening-closing belts 31a are provided so as to be symmetrically movable in the opening-closing direction (a horizontal direction) D2 orthogonal to the transfer direction (a horizontal direction) D1 of each container box 22. The two supply opening-closing belts 31a can be arranged at supply proximity positions Pc1 which are relatively close to each other and at supply remote positions Pc2 which are relatively far from each other. Similarly, the illustrated two discharge opening-closing belts 33a are provided so as to be symmetrically movable in an opening-closing direction D2 orthogonal to the transfer direction D1 of each container box 22. The two discharge opening-closing belts 33a can be arranged at discharge proximity positions Pf1 which are relatively close to each other and at discharge remote positions Pf2 which are relatively far from each other.

Each moving body 21 moves to a position corresponding to the first delivery transfer conveyor 31 in such a manner that any one or more of the two or more container boxes 22 that move together with each moving body 21 enter the space formed between the two supply opening-closing belts 31a arranged at the supply remote positions Pc2 (see FIG. 3). As a result, while contact and collision between the two or more container boxes 22 supported by each moving body 21 and the two supply opening-closing belts 31a are avoided, it is possible that each moving body 21 smoothly moves to a position corresponding to the first delivery transfer conveyor 31.

The first delivery holding unit 34 lifts the two or more container boxes 22 from each moving body 21 arranged at the position corresponding to the first delivery transfer conveyor 31 in such a manner that no container box 22 is present in the space formed between the two supply opening-closing belts 31a in a state where the two supply opening-closing belts 31a are arranged at the supply remote positions Pc2.

The illustrated first delivery holding unit 34 includes two members each having an L-shaped cross section. The two members of the first delivery holding unit 34 are provided so as to be symmetrically movable with respect to each other in the opening-closing direction D2 orthogonal to the transfer direction D1 of each container box 22, and can be arranged in holding positions which are relatively close to each other and in evacuation positions which are relatively far from each other. The two members of the first delivery holding unit 34 can sandwich a container box 22 in a state of being arranged at the holding positions, so as to hold the container box 22 in a state of being able to lift the container box 22 (see FIG. 3).

The two supply opening-closing belts 31a are moved from the supply remote positions Pc2 and are arranged at the supply proximity positions Pc1 in a state where no container box 22 is present in the space formed between the two supply opening-closing belts 31a. The size in the opening-closing direction D2 of the space formed between the two supply opening-closing belts 31a arranged at the supply proximity positions Pc1 is smaller than the size in the opening-closing direction D2 of each container box 22. The first delivery holding unit 34 can place two or more container boxes 22, lifted from each moving body 21, on the two supply opening-closing belts 31a arranged in the supply proximity positions Pc1 (see FIG. 2).

Each moving body 21 moves from the position corresponding to the first delivery transfer conveyor 31 to a position corresponding to the third delivery transfer conveyor 33 after all the container boxes 22 supported by each moving body 21 are transferred to the first delivery holding unit 34 (specifically, after all the container boxes 22 supported by each moving body 21 are lifted by the first delivery holding unit 34). The size of each moving body 21 (in particular, the size in the height direction) is not limited. When each moving body 21 is lower than the first delivery transfer conveyor 31, the second delivery transfer conveyor 32 and the third delivery transfer conveyor 33, each moving body 21 can move below the first delivery transfer conveyor 31, the second delivery transfer conveyor 32 and the third delivery transfer conveyor 33, and each moving body 21 can move linearly from the position corresponding to the first delivery transfer conveyor 31 to the position corresponding to the third delivery transfer conveyor 33 in the shortest distance.

A desired number of bag bundles 91 (in the example shown in FIG. 2, eight bag bundles 91) are supplied, by the bag bundle delivery device 13, to a container box 22 placed on the second delivery transfer conveyor 32, and the desired number of bag bundles 91 are placed on the bottom part (that is, the support part 20) of the container box 22.

A container box 22 sent from the second delivery transfer conveyor 32 is placed on the two discharge opening-closing belts 33a arranged at the discharge proximity positions Pf1 (see FIG. 2).

The second delivery holding unit 35 lifts one container box 22 or a plurality of container boxes 22 stacked on each other, from the two discharge opening-closing belts 33a arranged at the discharge proximity positions Pf1. The illustrated second delivery holding unit 35 includes two members each having an L-shaped cross section. The two members of the second delivery holding unit 35 are provided so as to be symmetrically movable in the opening-closing direction D2 orthogonal to the transfer direction D1 of each container box 22, and can be arranged in holding positions which are relatively close to each other and in evacuation positions which are relatively far from each other. The two members of the second delivery holding unit 35 can sandwich a container box 22 in a state of being arranged at the holding positions, so as to hold the container box 22 in a state of being able to lift the container box 22 (see FIG. 3).

The two discharge opening-closing belts 33a are arranged in the discharge remote positions Pf2 in a state where container boxes 22 are not placed on the two discharge opening-closing belts 33a and the second delivery holding unit 35 is lifting two or more container boxes 22 stacked on each other.

The second delivery holding unit 35 moves the lifted two or more container boxes 22 in such a manner that at least a part of the lifted two or more container boxes 22 passes through the space formed between the two discharge opening-closing belts 33a arranged at the discharge remote positions Pf2, and then delivers the two or more container boxes 22 to each moving body 21 arranged in the position corresponding to the third delivery transfer conveyor 33. As a result, while contact and collision between the two or more container boxes 22 supported by the second delivery holding unit 35 and the two discharge opening-closing belts 33a are avoided, the two or more container boxes 22 can be delivered to each moving body 21.

Next, a specific example of the transfer mode of container boxes 22 in the delivery zone Zr will be described. The transfer mode of container boxes 22 described below is only an example, and container boxes 22 may be transferred in another mode.

FIGS. 4A to 4J are side views for explaining an example of a transfer mode of container boxes 22a to 22f in the delivery zone Zr. In the example shown in FIGS. 4A to 4J, various devices of the bag supply system 10 are driven under the control of a control unit described later (see FIG. 5).

Figure 4A:
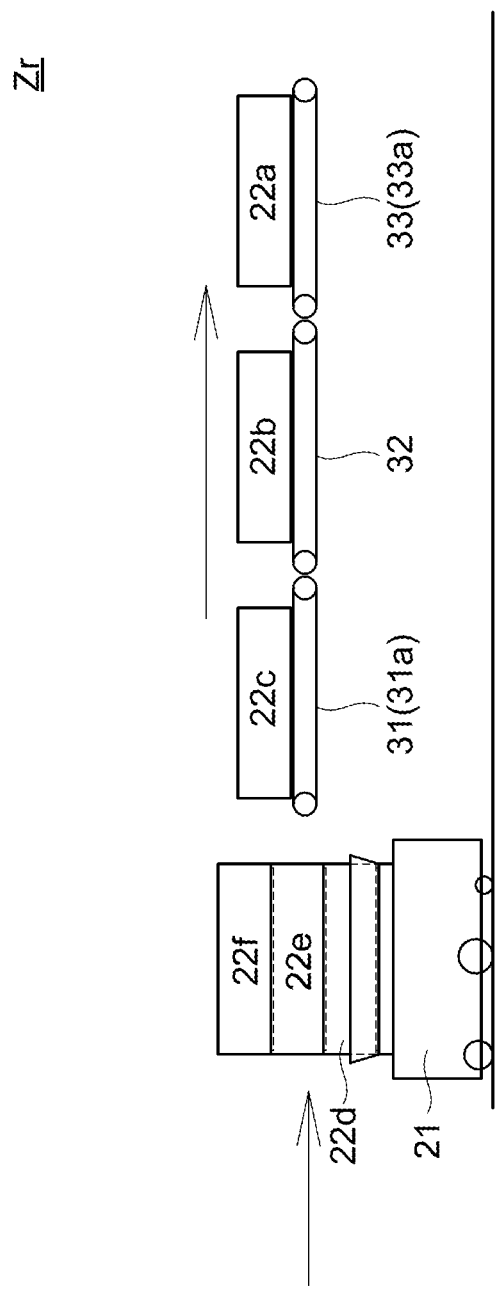

In the present example, first, it is assumed that one container box (i.e., container boxes 22a, 22b, 22c) is placed on each of the first delivery transfer conveyor 31, the second delivery transfer conveyor 32, and the third delivery transfer conveyor 33 as shown in FIG. 4A. In the example shown in FIG. 4A, a moving body 21 on which a plurality of container boxes (specifically, three container boxes 22d, 22e, 22f) are placed is waiting at a position immediately before the first delivery transfer conveyor 31.

In the state shown in FIG. 4A, the container box 22a placed on the third delivery transfer conveyor 33 is lifted by the second delivery holding unit 35, in such a manner that a container box is not placed on the third delivery transfer conveyor 33. After that, the second delivery transfer conveyor 32 and the third delivery transfer conveyor 33 are driven in such a manner that the container box 22b on the second delivery transfer conveyor 32 (in particular, the container box 22b in which a desired number of bag bundles 91 are stored) is transferred and is placed on the third delivery transfer conveyor 33 (see FIG. 4B). Further, the first delivery transfer conveyor 31 and the second delivery transfer conveyor 32 are driven in such a manner that the container box 22c on the first delivery transfer conveyor 31 is transferred and is placed on the second delivery transfer conveyor 32. In a state where the container box 22c is placed on the second delivery transfer conveyor 32, the bag bundle delivery device 13 sequentially loads a plurality of bag bundles 91 on the container box 22c.

Figure 4B:
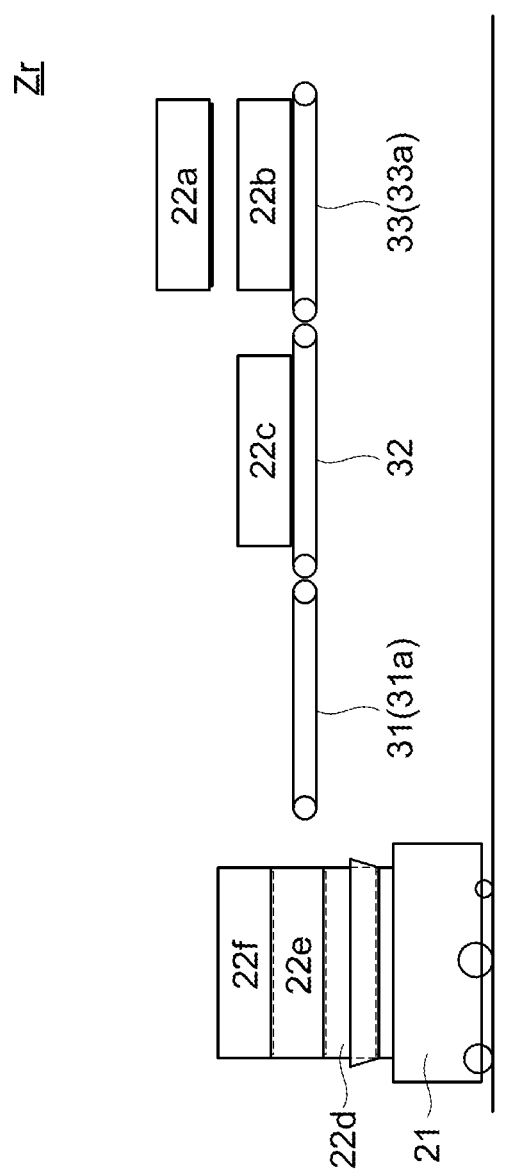

When the situation is shifted from the state shown in FIG. 4A to the state shown in FIG. 4B, the drive timing of the first delivery transfer conveyor 31 is not limited. For example, the container box 22c may be moved from the first delivery transfer conveyor 31 to the second delivery transfer conveyor 32 at the same time when the container box 22b is moved from the second delivery transfer conveyor 32 to the third delivery transfer conveyor 33. Further, the movement of the container box 22c from the first delivery transfer conveyor 31 to the second delivery transfer conveyor 32 may be started after the movement of the container box 22b from the second delivery transfer conveyor 32 to the third delivery transfer conveyor 33 is completed.

Figure 4C:
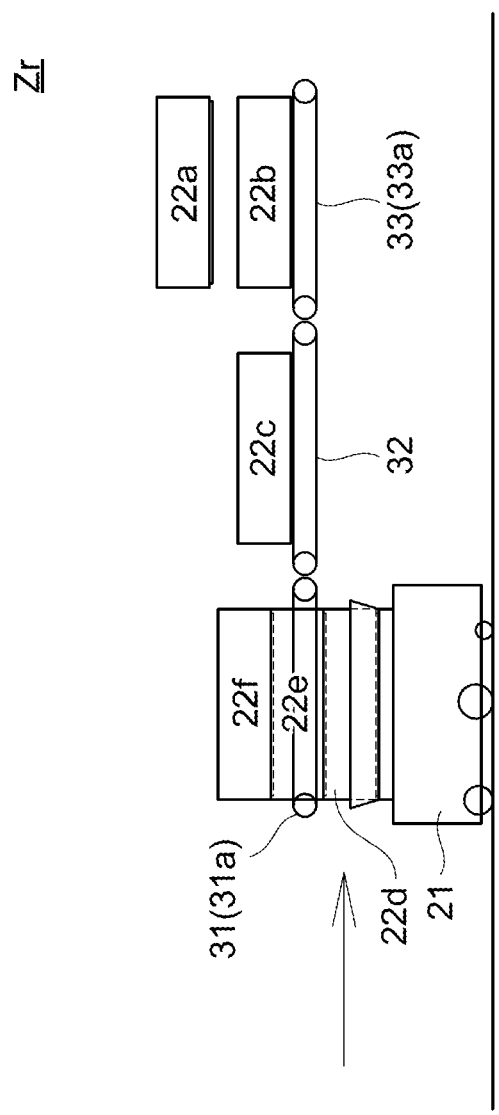

In the state shown in FIG. 4B, the two supply opening-closing belts 31a of the first delivery transfer conveyor 31 are arranged at the supply remote positions Pc2, and after that, the moving body 21 is moved, together with the container boxes 22d, 22e, 22f, to the position corresponding to the first delivery transfer conveyor 31 (see FIG. 4C). In a state where the moving body 21 is arranged at the position corresponding to the first delivery transfer conveyor 31, the moving body 21 is located directly below the space between the supply opening-closing belts 31a, and the container boxes 22d, 22e, 22f (in the illustrated example, the container box 22e in particular) supported by the moving body 21 are arranged so as to penetrate the space between the two supply opening-closing belts 31a.

Then, the container boxes 22d, 22e, 22f are lifted, by the first delivery holding unit 34, from the moving body 21 which is located at the position corresponding to the first delivery transfer conveyor 31 and are arranged above the first delivery transfer conveyor 31 (see FIG. 4D). As a result, a container box is not placed on the moving body 21 located at the position corresponding to the first delivery transfer conveyor 31. On the other hand, the second delivery holding unit 35 places the lifted container box 22a on the container box 22b on the third delivery transfer conveyor 33, and after that, lifts the two container boxes 22a, 22b while holding the container box 22b which is located at the lowest position on the third delivery transfer conveyor 33. As a result, a container box is not placed on the third delivery transfer conveyor 33.

Figure 4E:
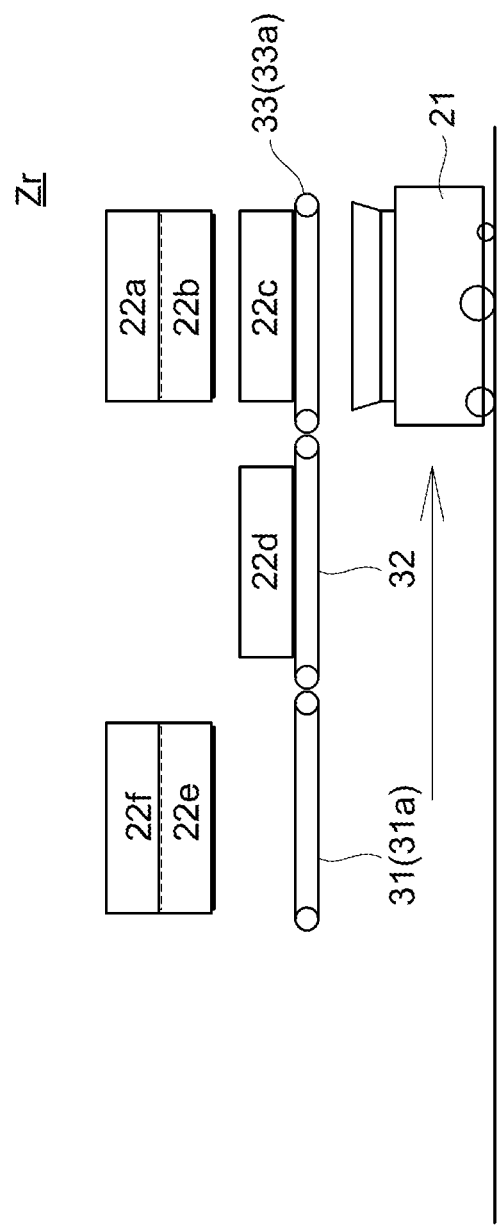

Then, the moving body 21 moves from the position corresponding to the first delivery transfer conveyor 31 to the position corresponding to the third delivery transfer conveyor 33 in a state where a container box is not placed on the moving body 21 (see FIG. 4E). On the other hand, the two supply opening-closing belts 31a are arranged at the supply proximity positions Pc1. The first delivery holding unit 34 places the lifted container boxes 22d, 22e, 22f on the first delivery transfer conveyor 31 in a state where the two supply opening-closing belts 31a are arranged at the supply proximity positions Pc1. After that, the first delivery holding unit 34 lifts the two container boxes 22e, 22f while holding the container box 22e located second from the bottom on the first delivery transfer conveyor 31, in such a manner that only one container box 22d is placed on the first delivery transfer conveyor 31.

On the other hand, the second delivery transfer conveyor 32 and the third delivery transfer conveyor 33 are driven in a state where a container box is not placed on the third delivery transfer conveyor 33, in such a manner that the container box 22c which is located on the second delivery transfer conveyor 32 and in which a desired number of bag bundles 91 are stored is transferred from the second delivery transfer conveyor 32 to the third delivery transfer conveyor 33. Further, the first delivery transfer conveyor 31 and the second delivery transfer conveyor 32 are driven at the same time as the transfer of the container box 22c on the second delivery transfer conveyor 32 or after the container box 22c is transferred to the third delivery transfer conveyor 33, in such a manner that the container box 22d on the first delivery transfer conveyor 31 is transferred from the first delivery transfer conveyor 31 to the second delivery transfer conveyor 32. Then, in a state where the container box 22d is placed on the second delivery transfer conveyor 32, a plurality of bag bundles 91 are sequentially placed on the container box 22d by the bag bundle delivery device 13.

Figure 4F:
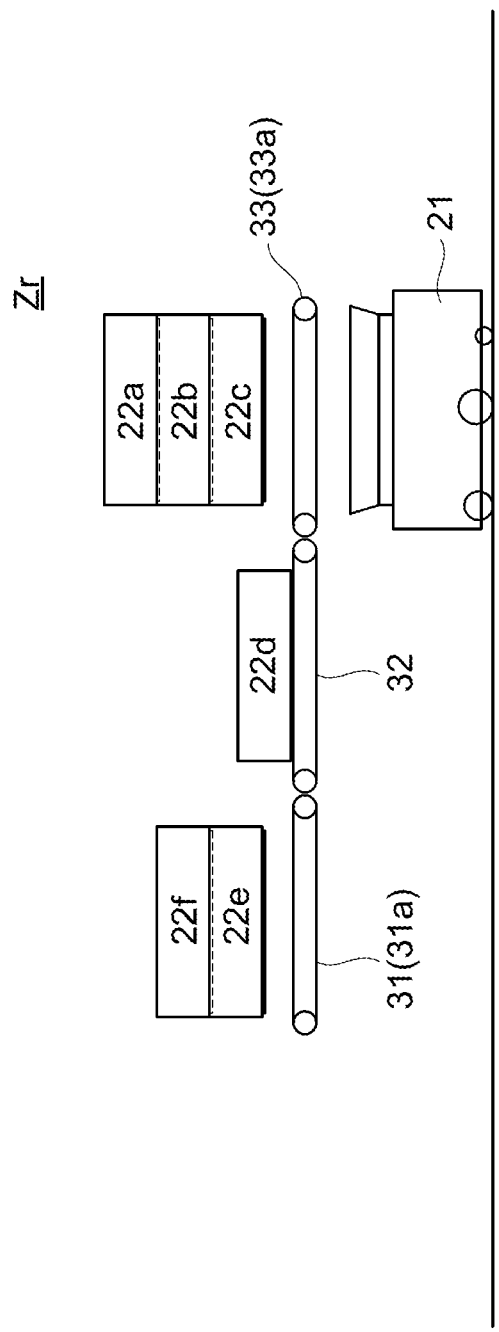

The second delivery holding unit 35 places the lifted container boxes 22a, 22b on the container box 22c on the third delivery transfer conveyor 33, and after that, lifts the three container boxes 22a, 22b, 22c while holding the container box 22c which is located at the lowermost position on the third delivery transfer conveyor 33 (see FIG. 4F). As a result, a container box is not placed on the third delivery transfer conveyor 33. After that, the two discharge opening-closing belts 33a are arranged at the discharge remote positions Pf2.

Figure 4G:
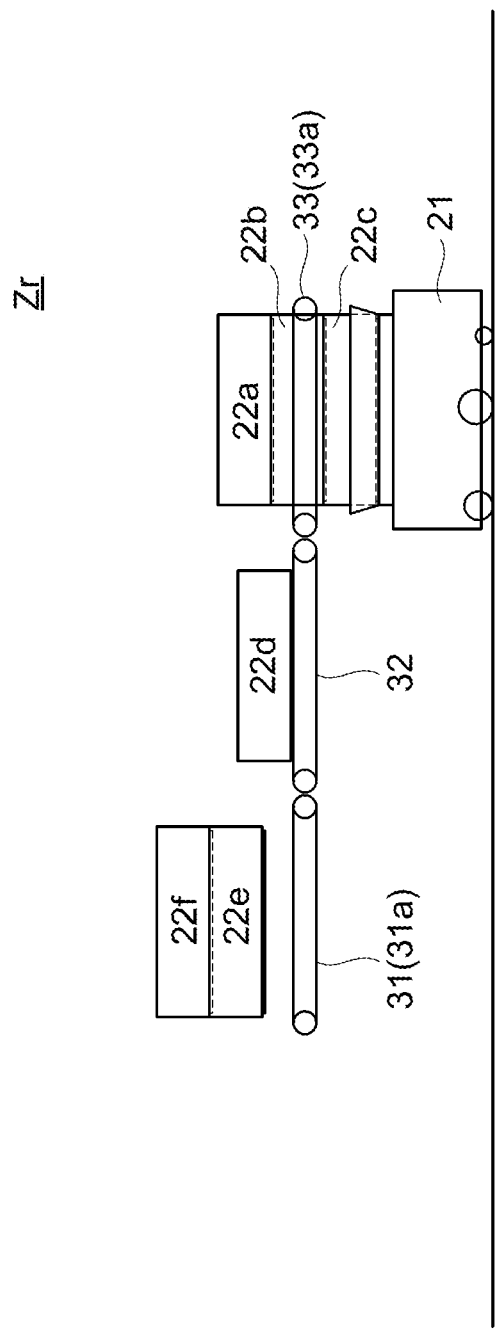
Figure 4I:
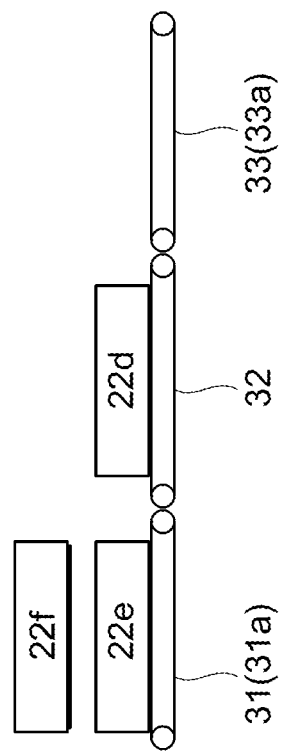

Then, the second delivery holding unit 35 lowers the container boxes 22a, 22b, 22c in a state where the two discharge opening-closing belts 33a are arranged at the discharge remote positions Pf2, so as to place these container boxes 22a, 22b, 22c on the moving body 21 arranged at the position corresponding to the third delivery transfer conveyor 33 (see FIG. 4G). The second delivery holding unit 35 releases the holding of the container boxes 22a, 22b, 22c (in particular, the container box 22c) after delivering the container boxes 22a, 22b, 22c to the moving body 21, and moves to a standby position which is located above the third delivery transfer conveyor 33.

Then, in a state where the two discharge opening-closing belts 33a are arranged at the discharge remote positions Pf2, the moving body 21 moves, together with the container boxes 22a, 22b, 22c, from the position corresponding to the third delivery transfer conveyor 33 towards the supply zone Zd (see FIG. 4H). After the moving body 21 moves from the position corresponding to the third delivery transfer conveyor 33, the two discharge opening-closing belts 33a are arranged at the discharge proximity positions Pf1.

Then, the first delivery holding unit 34 places the lifted container boxes 22e, 22f on the first delivery transfer conveyor 31 in a state where the two supply opening-closing belts 31a are arranged at the supply proximity positions Pc1. After that, the first delivery holding unit 34 holds and lifts the container box 22f located second from the bottom on the first delivery transfer conveyor 31, in such a manner that only one container box 22e is placed on the first delivery transfer conveyor 31 (see FIG. 4I).

Figure 4J:
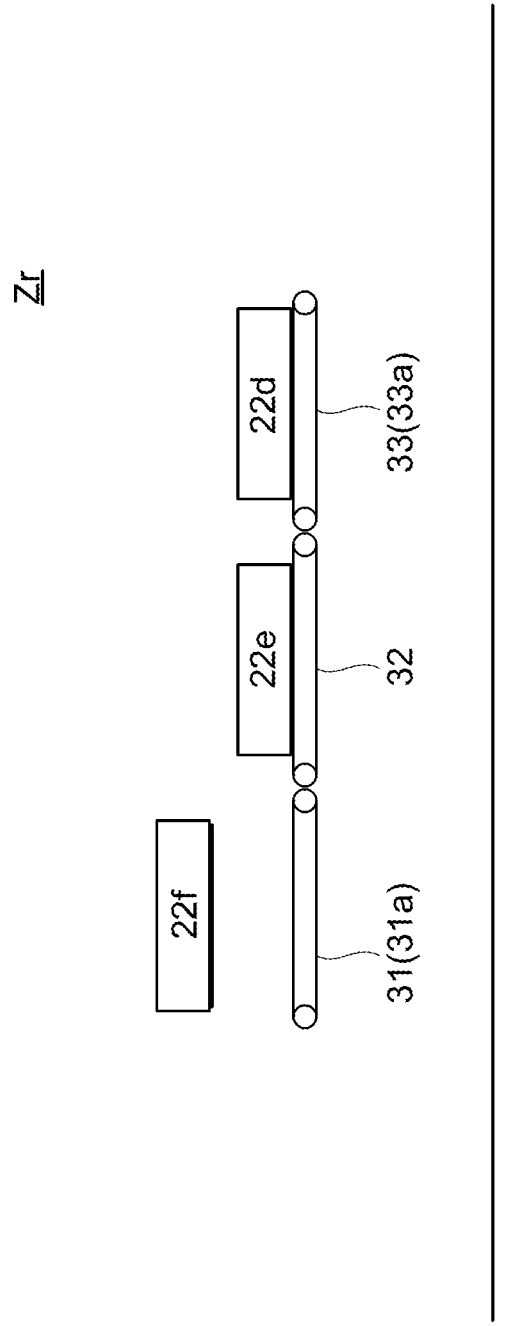

After that, the second delivery transfer conveyor 32 and the third delivery transfer conveyor 33 are driven in a state where a container box is not placed on the third delivery transfer conveyor 33, in such a manner that the container box 22*d* storing a desired number of bag bundles 91 is transferred from the second delivery transfer conveyor 32 to the third delivery transfer conveyor 33 (see FIG. 4J). Further, the first delivery transfer conveyor 31 and the second delivery transfer conveyor 32 are driven at the same time as the transfer of the container box 22*d* on the second delivery transfer conveyor 32 or after the container box 22*d* is transferred to the third delivery transfer conveyor 33, in such a manner that the container box 22*e* is transferred from the first delivery transfer conveyor 31 to the second delivery transfer conveyor 32. In a state where the container box 22*e* is placed on the second delivery transfer conveyor 32, a plurality of bag bundles 91 are sequentially placed on the container box 22*d* by the bag bundle delivery device 13.

Then, the first delivery holding unit 34 places the lifted container box 22*f* on the first delivery transfer conveyor 31 in a state where the two supply opening-closing belts 31*a* are arranged at the supply proximity positions Pc1.

After that, the above-described operations shown in FIGS. 4A to 4J are repeated.

In the present embodiment, the supply conveyance unit 26 provided in the supply zone Zd has a configuration corresponding to the delivery conveyance unit 25 described above. Specifically, the first supply transfer conveyor 41, the second supply transfer conveyor 42 and the third supply transfer conveyor 43 have configurations corresponding to the above-described first delivery transfer conveyor 31, second delivery transfer conveyor 32 and third delivery transfer conveyor 33, respectively. Therefore, the first supply transfer conveyor 41 has two opening-closing belts, and these two opening-closing belts can be arranged in proximity positions which are relatively close to each other and at remote positions which are relatively far from each other. Further, the third supply transfer conveyor 43 also has two opening-closing belts, and these two opening-closing belts can be arranged in proximity positions which are relatively close to each other and at remote positions which are relatively far from each other. In addition, each of a first supply holding unit 44 and a second supply holding unit 45 includes two members having an L-shaped cross section that are symmetrically movable in the opening-closing direction D2 orthogonal to the transfer direction D1 of each container box 22, and are capable of lifting a container box 22 while holding the container box 22.

Also, the behaviors of the first supply transfer conveyor 41, the second supply transfer conveyor 42, the third supply transfer conveyor 43, the first supply holding unit 44, the second supply holding unit 45 and each moving body 21 in the supply zone Zd are basically the same as the behaviors of the first delivery transfer conveyor 31, the second delivery transfer conveyor 32, the third delivery transfer conveyor 33, the first delivery holding unit 34, the second delivery holding unit 35 and each moving body 21 in the delivery zone Zr described above.

However, with respect to a container box 22 placed on the second supply transfer conveyor 42, the takeoff process of bag bundles 91 are performed by the bag bundle takeoff device 15. Specifically, while a container box 22 is placed on the second supply transfer conveyor 42, all the bag bundles 91 are taken out of the container box 22 by the bag bundle takeoff device 15. The empty container box 22 is transferred from the second supply transfer conveyor 42 to the third supply transfer conveyor 43. Then, a plurality of empty container boxes 22 (in the illustrated example, three container boxes 22) being stacked are placed, by the second supply holding unit 45, on each moving body 21 arranged in a position corresponding to the third supply transfer conveyor 43. Then, each moving body 21 moves, together with the plurality of empty container boxes 22, from the supply zone Zd towards the delivery zone Zr (see FIG. 4A).

Figure 5:
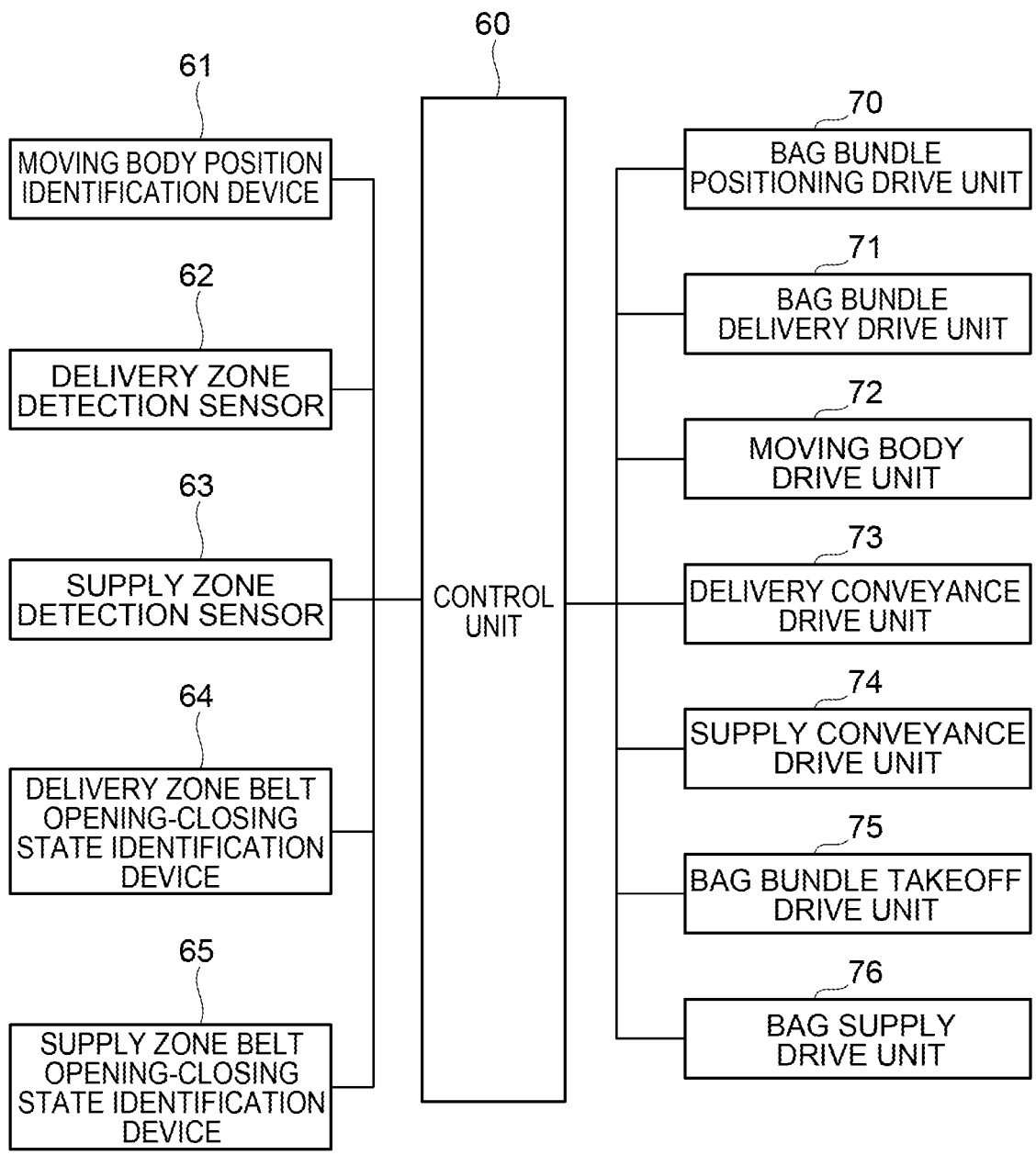
FIG. 5 is a functional block diagram illustrating an example of a control configuration.

FIG. 5 is a functional block diagram illustrating an example of the control configuration.

Although not shown in FIG. 1, a control unit 60 included in the bag supply system 10 can be installed at any position. Each functional block shown in FIG. 5 can be configured by combining arbitrary hardware and software. Therefore, each functional block may be realized by a single device or a plurality of devices, and two or more functional blocks may be realized by a single device. The various types of information which the control unit 60 can obtain may be information obtained directly from physical detection or information obtained indirectly from various operating states. Further, the control unit 60 may obtain various kinds of information based on output signals (wired signals or wireless signals) from sensors and drive control devices that are provided separately from the control unit 60 or may obtain various kinds of information based on control information and/or data which the control unit 60 itself has.

Typically, as shown in FIG. 5, the control unit 60 is provided with information on the position of each moving body 21 by a moving body position identification device 61, is provided with information on the arrangement of container boxes 22 in the delivery zone Zr by a delivery zone detection sensor 62, and is provided with information on the arrangement of container boxes 22 in the supply zone Zd by a supply zone detection sensor 63. Further, the control unit 60 is provided with information on the opening-closing state of the opening-closing belts in the delivery zone Zr (that is, each supply opening-closing belt 31*a* and each discharge opening-closing belt 33*a*) by a delivery zone belt opening-closing state identification device 64, and is provided with information on the opening-closing state of the opening-closing belts in the supply zone Zd (that is, the opening-closing belts included in each of the first supply transfer conveyor 41 and the third supply transfer conveyor 43) by a supply zone belt opening-closing state identification device 65.

The moving body position identification device 61 can be configured by, for example, a position information acquisition unit mounted on each moving body 21. For example, the moving body position identification device 61 may be configured by a position information acquisition unit that is capable of reading codes, such as two-dimensional codes, drawn on the floor or the ceiling so as to acquire the position information. The delivery zone detection sensor 62 and the supply zone detection sensor 63 can be configured by, for example, optical sensors installed in the delivery zone Zr and the supply zone Zd. The delivery zone belt opening-closing state identification device 64 and the supply zone belt opening-closing state identification device 65 may be configured by a delivery conveyance drive unit 73 and a supply conveyance drive unit 74 which perform the opening-closing driving of the respective opening-closing belts based on control signals from the control unit 60.

The control unit 60 controls the bag bundle positioning device 12 via a bag bundle positioning drive unit 70, controls the bag bundle delivery device 13 via a bag bundle delivery drive unit 71, and controls each moving body 21 via a moving body drive unit 72. Further, the control unit 60 controls the delivery conveyance unit 25 (specifically, the first delivery transfer conveyor 31, the second delivery transfer conveyor 32, the third delivery transfer conveyor 33, the first delivery holding unit 34 and the second delivery holding unit 35), in the delivery zone Zr via the delivery conveyance drive unit 73 and controls the transfer conveyors in the supply zone Zd (specifically, the first supply transfer conveyor 41, the second supply transfer conveyor 42, the third supply transfer conveyor 43, the first supply holding unit 44 and the second supply holding unit 45) via the supply conveyance drive unit 74. Further, the control unit 60 controls the bag bundle takeoff device 15 via a bag bundle takeoff drive unit 75 and controls the bag supply device 16 via a bag supply drive unit 76.

The bag bundle positioning drive unit 70 can be configured by drive devices of the bag bundle positioning device 12 (including the transfer device 50 and the delivery grip devices 51). The bag bundle delivery drive unit 71 can be configured by a drive device of the bag bundle delivery device 13. The moving body drive unit 72 can be configured by a drive device of each moving body 21. The delivery conveyance drive unit 73 can be configured by respective drive devices of the first delivery transfer conveyor 31, the second delivery transfer conveyor 32, the third delivery transfer conveyor 33, the first delivery holding unit 34 and the second delivery holding unit 35. The supply conveyance drive unit 74 can be configured by respective drive devices of the first supply transfer conveyor 41, the second supply transfer conveyor 42, the third supply transfer conveyor 43, the first supply holding unit 44 and the second supply holding unit 45. The bag bundle takeoff drive unit 75 can be configured by a drive device of the bag bundle takeoff device 15. The bag supply drive unit 76 can be configured by drive devices of the bag supply device 16 (including the posture change devices 52 and the bag takeoff devices 53).

For example, when a container box 22 is sent to the downstream side, when a container box 22 is lifted and/or when opening-closing belts are opened or closed, the control unit 60 can confirm "the presence or absence of a container box 22 or the number of container boxes 22 on a corresponding transfer conveyor" according to the information provided from the delivery zone detection sensor 62 and/or the supply zone detection sensor 63, and can perform control according to the confirmation results.

As described above, according to the present embodiment, a series of processes from putting bag bundles 91 (bag 90) into container boxes 22 to supplying bags 90 to the packaging machine 17 (a subsequent stage) can be appropriately performed without intervention of a worker and consequently bags 90 can be conveyed in a hygienic environment.

Further, a plurality of container boxes 22 can be transferred in a stacked state from the delivery zone Zr to the supply zone Zd and it is possible to carry a large number of bags 90 to the supply zone Zd at one time. Thus, for example, even if the number of moving bodies 21 is reduced or the transfer speed of each container box 22 by a moving body 21 is reduced, it is possible to supply bags 90 to the packaging machine 17 (a subsequent stage) at a desired rate without reducing the supply amount of bags 90 per unit time to the supply zone Zd. Further, by reducing the number of moving bodies 21, the cost required for the moving bodies 21 can be suppressed and it is possible to prevent the movement control of the moving bodies 21 from becoming complicated. Further, by lowering the speed of transfer of each container box 22 by a moving body 21, it is possible to suppress an increase in inertial force acting on each container box 22 and each bag bundle 91 (each bag 90), and consequently container boxes 22 can be prevented from dropping from each moving body 21 and it is possible to prevent the disturbance in the posture of each bag bundle 91 (each bag 90) in each container box 22.

Further, by providing three or more conveyors in the delivery zone Zr (in the above embodiment, by providing the first delivery transfer conveyor 31, the second delivery transfer conveyor 32 and the third delivery transfer conveyor 33), it is possible to smoothly perform the supply of container boxes 22 to the delivery zone Zr, the supply of bag bundles 91 to each container box 22, and the transfer of container boxes 22 from the delivery zone Zr. For example, when only one or two conveyors are provided in the delivery zone Zr, the first delivery holding unit 34 and/or the second delivery holding unit 35 are required to move not only in the height direction but also in the horizontal direction, and thus the control of the first delivery holding unit 34 and/or the second delivery holding unit 35 becomes complicated. On the other hand, by providing three or more conveyors in the delivery zone Zr, it is possible to move the first delivery holding unit 34 and the second delivery holding unit 35 only in the height direction without moving them in the horizontal direction.

Similarly, by providing three or more conveyors in the supply zone Zd (in the above embodiment, by providing the first supply transfer conveyor 41, the second supply transfer conveyor 42 and the third supply transfer conveyor 43), it is possible to smoothly perform the supply of container boxes 22 to the supply zone Zd, the removal of bag bundles 91 from each container box 22, and the transfer of container boxes 22 from the supply zone Zd.

Further, by using an automated guided vehicle for each moving body 21, it is possible to flexibly determine the moving route of each moving body 21, the flexibility of layout of the bag supply system 10 is improved, and each moving body 21 can flexibly adjust to a change in the layout of the bag supply system 10.

Further, since the first delivery transfer conveyor 31 has two movable supply opening-closing belts 31a, a container box 22 can be transferred easily and reliably from each moving body 21 to the first delivery transfer conveyor 31. Similarly, since the third delivery transfer conveyor 33 has two movable discharge opening-closing belts 33a, a container box 22 can be transferred easily and reliably from the third delivery transfer conveyor 33 to each moving body 21. Further, it is possible to move each of the first delivery holding unit 34 and the second delivery holding unit 35 only in the height direction without moving them in the horizontal direction.

Similarly, since each of the first supply transfer conveyor 41 and the third supply transfer conveyor 43 has two movable opening-closing belts, a container box 22 can be transferred easily and reliably from each moving body 21 to the first supply transfer conveyor 41 and a container box 22 can be transferred easily and reliably from the third supply transfer conveyor 43 to each moving body 21. Furthermore, it is possible to move each of the first supply holding unit 44 and the second supply holding unit 45 only in the height direction without moving them in the horizontal direction.

Second Embodiment

In the present embodiment, the same or similar elements as those of the above-described first embodiment are designated by the same reference numerals and the detailed description thereof will be omitted.

The bag supply system 10 may comprise a plurality of packaging machines 17. The bag supply system 10 may have a plurality of supply zones Zd and different supply zones Zd may be assigned to the plurality of packaging machines 17, respectively.

Figure 6:
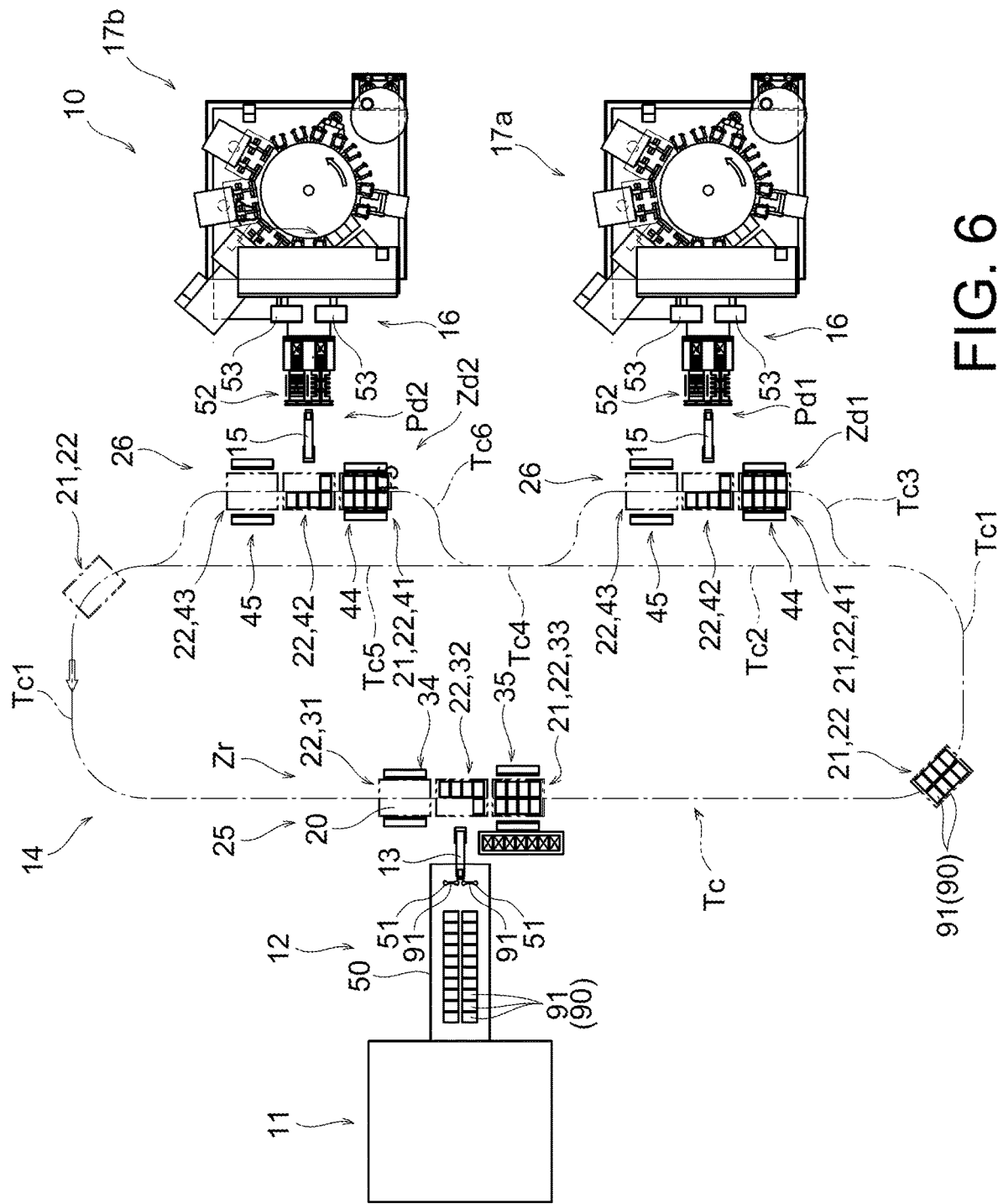
FIG. 6 is a diagram illustrating an example of a bag supply system according to a second embodiment.

FIG. 6 is a diagram illustrating an example of the bag supply system 10 according to the second embodiment.

In the example shown in FIG. 6, as for the supply zones Zd, a first supply zone Zd1 and a second supply zone Zd2 are provided in different areas. Further, as for the supply relay positions Pd, a first supply relay position Pd1 corresponding to the first supply zone Zd1 and a second supply relay position Pd2 corresponding to the second supply zone Zd2 are provided. Further, as for the packaging machines 17, a first packaging machine 17a and a second packaging machine 17b are provided in mutually different areas.

In the example shown in FIG. 6, two supply conveyance units 26 (specifically, two first supply transfer conveyors 41, two second supply transfer conveyors 42, two third supply transfer conveyors 43, two first supply holding units 44 and two second supply holding units 45) are provided so as to be assigned to the first supply zone Zd1 and the second supply zone Zd2 respectively. Similarly, two bag bundle takeoff devices 15 and two bag supply devices 16 are provided.

The bag bundle takeoff device 15 assigned to the first supply zone Zd1 transfers bag bundles 91 held in the first supply zone Zd1, from the bag bundle conveyance device 14 (specifically, a container box 22) to the first supply relay position Pd1. Similarly, the bag bundle takeoff device 15 assigned to the second supply zone Zd2 transfers bag bundles 91 held in the second supply zone Zd2, from the bag bundle conveyance device 14 (specifically, a container box 22) to the second supply relay position Pd2. In this way, the bags 90 included in a bag bundle 91 taken out from the first supply zone Zd1 are supplied to the first packaging machine 17a through the above-mentioned devices assigned to the first supply zone Zd1 and the first packaging machine 17a. Similarly, the bags 90 included in a bag bundle 91 taken out from the second supply zone Zd2 are supplied to the second packaging machine 17b through the above-mentioned devices assigned to the second supply zone Zd2 and the second packaging machine 17b.

The bag bundle conveyance device 14 conveys bag bundles 91 from the delivery zone Zr to at least one of the first supply zone Zd1 and the second supply zone Zd2 in a state where the bag bundles 91 are supported by the support part 20 of a corresponding container box 22. Specifically, each moving body 21 and each container box 22 (each support part 20) moves along an endless track Tc between the delivery zone Zr and at least one of the first supply zone Zd1 and the second supply zone Zd2.

In the example shown in FIG. 6, the endless track Tc, which is the moving route of each moving body 21 and each container box 22, includes a first track part Tc1 to a sixth track part Tc6. The first track part Tc1 includes a path extending from the delivery zone Zr toward the first supply zone Zd1, a path extending from the second supply zone Zd2 toward the delivery zone Zr, and a path extending so as to pass through the delivery zone Zr. The second track part Tc2 and the third track part Tc3 are paths diverge from the first track part Tc1 extending from the delivery zone Zr towards the first supply zone Zd1. The second track part Tc2 is a path extending so as to bypass the first supply zone Zd1. The third track part Tc3 is a path extending so as to pass through the first supply zone Zd1. The fourth track part Tc4 is a path which the second track part Tc2 and the third track part Tc3 join. The fifth track part Tc5 is a path extending so as to bypass the second supply zone Zd2. The sixth track part Tc6 is a path extending so as to pass through the second supply zone Zd2. The fifth track part Tc5 and the sixth track part Tc6 join the first track part Tc1 extending from the second supply zone Zd2 towards the delivery zone Zr.

A container box 22 supplied from the delivery zone Zr to the first supply zone Zd1 and a corresponding moving body 21 reach the first supply zone Zd1 through the first track part Tc1 and the third track part Tc3, and return to the delivery zone Zr through the third track part Tc3, the fourth track part Tc4, the fifth track part Tc5 and the first track part Tc1. On the other hand, a container box 22 supplied from the delivery zone Zr to the second supply zone Zd2 and a corresponding moving body 21 reach the second supply zone Zd2 through the first track part Tc1, the second track part Tc2, the fourth track part Tc4 and the sixth track part Tc6, and return to the delivery zone Zr through the sixth track part Tc6 and the first track part Tc1. Each moving body 21 is driven so as to follow an appropriate path under the control of the control unit 60.

As described above, according to the present embodiment, it is possible to drive a plurality of packaging machines 17 in parallel and improve productivity. In particular, in a case where the production rate of bags 90 in the bag making machine 11 is higher than the consumption rate (usage rate) of bags 90 in a packaging machine 17, it is possible to balance the production rate of bags 90 and the consumption rate of bags 90 with a high level by installing a plurality of packaging machines 17.

Variations

The present disclosure is not limited to the above-mentioned embodiments and modified examples. For example, various modifications may be added to each element of the above-described embodiments and modified examples. Further, the configurations of the above-described embodiments and modified examples may be combined in whole or in part.

The support part 20 may be configured by an element other than a container box 22. For example, the bag bundle conveyance device 14 may be configured by a belt conveyor, and the support part 20 may be configured by one or a plurality of conveyance belts traveling along an endless track.

In each of the delivery zone Zr and the supply zone Zd, three transfer conveyors are provided in the above-mentioned embodiments, but only two transfer conveyors may be provided or four or more transfer conveyors may be provided.

The specific configurations of the first delivery holding unit 34 and the second delivery holding unit 35 and the method of holding a container box 22 are not limited, and the above-mentioned "two members having an L-shaped cross section" may not be used.

A standby zone for each moving body 21 and each container box 22 may be provided on an endless track of each moving body 21. For example, in a case where a plurality of supply zones Zd are provided (see FIG. 6), a zone where each moving body 21 and each container box 22 (in particular, each container box 22 in which bag bundles 91 are being stored) are to wait may be provided on a path between the delivery zone Zr and a first supply zone Zd (see the first supply zone Zd1 in FIG. 6) and/or on a path between the supply zones Zd. In this case, it is possible that a container box 22 to which bag bundles 91 have been supplied in the delivery zone Zr is made to stand by in the standby zone, and a new container box 22 is adaptively sent from the standby zone to each supply zone Zd at the timing when new bag bundles 91 need to be supplied.

The invention claimed is:

1. A bag supply system comprising:
   a bag bundle positioning device configured to sequentially arrange bag bundles in a delivery relay position, each of the bag bundles including two or more bags supplied from a bag making machine;
   a bag bundle delivery device configured to move the bag bundles from the delivery relay position to a delivery zone;
   a bag bundle conveyance device comprising a support part being configured for moving, the bag bundle conveyance device configured to receive the bag bundles from the bag bundle delivery device in the delivery zone and convey the bag bundles from the delivery zone to a supply zone in a state where the bag bundles are supported by the support part;
   a bag bundle takeoff device configured to hold the bag bundles supported by the support part in the supply zone and move the bag bundles from the bag bundle conveyance device to a supply relay position; and
   a bag supply device configured to sequentially supply bags included in each of the bag bundles arranged in the supply relay position, to a packaging machine,
   wherein the support part moves along an endless track between the delivery zone and the supply zone.

2. The bag supply system as defined in claim 1, wherein the bag bundle conveyance device includes:
   a plurality of moving bodies each of which moves along the endless track between the delivery zone and the supply zone;
   a plurality of container boxes each of which has the support part and is configured for storing a plurality of bag bundles;
   a delivery conveyance unit configured to be provided in the delivery zone; and
   a supply conveyance unit configured to be provided in the supply zone,
   wherein each of the plurality of moving bodies moves between the delivery zone and the supply zone, together with two or more container boxes stacked on each other,
   wherein the delivery conveyance unit receives two or more container boxes stacked on each other from each of the plurality of moving bodies, takes out container boxes from the two or more container boxes one by one, and transfers to each of the plurality of moving bodies two or more container boxes each of which stores two or more bag bundles received from the bag bundle delivery device, in a state where the two or more container boxes are stacked on each other, and
   wherein the supply conveyance unit receives two or more container boxes stacked on each other from each of the plurality of moving bodies, takes out container boxes from the two or more container boxes one by one, and transfers to each of the plurality of moving bodies two or more container boxes from which the bag bundles have been taken out by the bag bundle takeoff device, in a state where the two or more container boxes are stacked on each other.

3. The bag supply system as defined in claim 2, wherein the delivery conveyance unit includes a first delivery transfer conveyor, a second delivery transfer conveyor, a third delivery transfer conveyor, a first delivery holding unit and a second delivery holding unit,
   wherein the two or more container boxes that are delivered from each of the plurality of moving bodies and are stacked on each other are placed on the first delivery transfer conveyor,
   wherein the first delivery holding unit lifts one or more container boxes from the first delivery transfer conveyor in such a manner that only one container box is placed on the first delivery transfer conveyor,
   wherein the first delivery transfer conveyor and the second delivery transfer conveyor are driven in a state where only one container box is placed on the first delivery transfer conveyor in such a manner that the one container box is transferred from the first delivery transfer conveyor and is placed on the second delivery transfer conveyor,
   wherein the bag bundle delivery device delivers two or more bag bundles to a container box placed on the second delivery transfer conveyor,
   wherein the second delivery holding unit lifts one container box or two or more container boxes stacked on each other, from the third delivery transfer conveyor in such a manner that no container box is placed on the third delivery transfer conveyor, and
   wherein the second delivery transfer conveyor and the third delivery transfer conveyor are driven, in a state where a container box storing two or more bag bundles is placed on the second delivery transfer conveyor and no container box is placed on the third delivery transfer conveyor, in such manner that the container box storing two or more bag bundles is transferred from the second delivery transfer conveyor and is placed on the third delivery transfer conveyor.

4. The bag supply system as defined in claim 3, wherein the first delivery transfer conveyor has two supply opening-closing belts that are configured to be arranged in supply proximity positions that are relatively close to each other, and in supply remote positions that are relatively far from each other,
   wherein each of the plurality of moving bodies moves to a position corresponding to the first delivery transfer conveyor in such a manner that at least one of two or more container boxes moving along with each of the plurality of moving bodies enters a space formed between the two supply opening-closing belts arranged in the supply remote positions,
   wherein the first delivery holding unit lifts two or more container boxes from each of the plurality of moving bodies arranged in the position corresponding to the first delivery transfer conveyor in such a manner that no container box is present in the space formed between the two supply opening-closing belts in a state where the two supply opening-closing belts are arranged in the supply remote positions,
   wherein the two supply opening-closing belts move from the supply remote positions in a state where no container box is present in the space formed between the two supply opening-closing belts, and are arranged in the supply proximity positions, and
   wherein the first delivery holding unit places the two or more container boxes lifted from each of the plurality of moving bodies, onto the two supply opening-closing belts arranged in the supply proximity positions.

5. The bag supply system as defined in claim 4, wherein the third delivery transfer conveyor has two discharge opening-closing belts that are configured to be arranged in discharge proximity positions that are relatively close to each other, and in discharge remote positions that are relatively far from each other,
- wherein a container box sent from the second delivery transfer conveyor is placed on the two discharge opening-closing belts arranged in the discharge proximity positions,
- wherein the second delivery holding unit lifts one container box or a plurality of container boxes stacked on each other, from the two discharge opening-closing belts arranged in the discharge proximity positions,
- wherein the two discharge opening-closing belts are arranged in the discharge remote positions in a state where no container box is placed on the two discharge opening-closing belts and the second delivery holding unit lifts two or more container boxes stacked on each other, and
- wherein the second delivery holding unit moves the lifted two or more container boxes in such a manner that at least a part of the lifted two or more container boxes passes a space formed between the two discharge opening-closing belts arranged in the discharge remote positions, and delivers the two or more container boxes to each of the plurality of moving bodies arranged in a position corresponding to the third delivery transfer conveyor.

6. The bag supply system as defined in claim 5, wherein each of the plurality of moving bodies is an automated guided vehicle.

7. The bag supply system as defined in claim 4, wherein each of the plurality of moving bodies is an automated guided vehicle.

8. The bag supply system as defined in claim 3, wherein the third delivery transfer conveyor has two discharge opening-closing belts that are configured to be arranged in discharge proximity positions that are relatively close to each other, and in discharge remote positions that are relatively far from each other,
- wherein a container box sent from the second delivery transfer conveyor is placed on the two discharge opening-closing belts arranged in the discharge proximity positions,
- wherein the second delivery holding unit lifts one container box or a plurality of container boxes stacked on each other, from the two discharge opening-closing belts arranged in the discharge proximity positions,
- wherein the two discharge opening-closing belts are arranged in the discharge remote positions in a state where no container box is placed on the two discharge opening-closing belts and the second delivery holding unit lifts two or more container boxes stacked on each other, and
- wherein the second delivery holding unit moves the lifted two or more container boxes in such a manner that at least a part of the lifted two or more container boxes passes a space formed between the two discharge opening-closing belts arranged in the discharge remote positions, and delivers the two or more container boxes to each of the plurality of moving bodies arranged in a position corresponding to the third delivery transfer conveyor.

9. The bag supply system as defined in claim 8, wherein each of the plurality of moving bodies is an automated guided vehicle.

10. The bag supply system as defined in claim 3, wherein each of the plurality of moving bodies is an automated guided vehicle.

11. The bag supply system as defined in claim 2, wherein each of the plurality of moving bodies is an automated guided vehicle.

12. The bag supply system as defined in claim 1, wherein a first supply zone and a second supply zone are provided in mutually different areas as said supply zone,
- wherein a first supply relay position corresponding to the first supply zone and a second supply relay position corresponding to the second supply zone are provided as said supply relay position,
- wherein the bag bundle conveyance device conveys the bag bundles from the delivery zone to at least one of the first supply zone and the second supply zone in a state where the bag bundles is supported by the support part,
- wherein the bag bundle takeoff device moves the bag bundles that the bag bundle takeoff device holds in the first supply zone, from the bag bundle conveyance device to the first supply relay position, and moves the bag bundles that the bag bundle takeoff device holds in the second supply zone, from the bag bundle conveyance device to the second supply relay position, and
- wherein the support part moves along the endless track between the delivery zone and at least one of the first supply zone and the second supply zone.

* * * * *